United States Patent
Chen et al.

(10) Patent No.: US 9,231,839 B1
(45) Date of Patent: Jan. 5, 2016

(54) COMMUNICATION UNIT AND METHOD FOR DETERMINING AND/OR COMPENSATING FOR FREQUENCY DEPENDENT QUADRATURE MISMATCH

(71) Applicant: MEDIATEK INC., Hsin-Chu (TW)

(72) Inventors: Kuo-Hao Chen, Hsinchu (TW); Chun-Hao Liao, Taichung (TW); Kiran Uln, Pleasanton, CA (US); Shuling Feng, Saratoga, CA (US)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 14/324,258

(22) Filed: Jul. 7, 2014

(51) Int. Cl.
  *H04L 12/26* (2006.01)
  *H04L 27/00* (2006.01)

(52) U.S. Cl.
  CPC ..... *H04L 43/0823* (2013.01); *H04L 2027/0016* (2013.01)

(58) Field of Classification Search
  CPC .................................................. H04L 43/0823
  USPC ........................................................ 375/224
  See application file for complete search history.

(56) References Cited

U.S. PATENT DOCUMENTS

| | | | |
|---|---|---|---|
| 2004/0203472 A1* | 10/2004 | Chien | 455/68 |
| 2007/0025474 A1* | 2/2007 | Moorti et al. | 375/329 |
| 2010/0166049 A1* | 7/2010 | Ahirwar et al. | 375/221 |
| 2012/0263215 A1* | 10/2012 | Peng | 375/221 |

* cited by examiner

*Primary Examiner* — Michael Neff
(74) *Attorney, Agent, or Firm* — Winston Hsu; Scott Margo

(57) ABSTRACT

A communication unit includes: a quadrature transmitter having analog transmit filter(s) for filtering a first quadrature test signal. An analog feedback loopback path selectively first routes the filtered quadrature first test signal to a quadrature receiver. The quadrature receiver has: at least one analog receive filter for further filtering the filtered quadrature first test signal; and a quadrature receive baseband circuit arranged to receive and decode the further filtered quadrature first test signal. The quadrature transmitter is arranged to receive a second quadrature test signal and the analog feedback loopback path selectively routes a filtered quadrature second test signal to the quadrature receiver via a second route such that the quadrature receive baseband circuit is arranged to determine a frequency-dependent quadrature imbalance of at least one component in the transmitter/receiver based on the decoded further filtered first quadrature test signal and the decoded further filtered second quadrature test signal.

18 Claims, 9 Drawing Sheets

COMMUNICATION UNIT AND METHOD FOR DETERMINING AND/OR COMPENSATING FOR FREQUENCY DEPENDENT QUADRATURE MISMATCH

BACKGROUND

1. Field of the Invention

The field of this invention relates generally to frequency dependent quadrature mismatch determination/calibration and compensation therefor, and in particular to quadrature (I/Q) compensation of frequency-dependent response mismatch of transmit and/or receive analog filters.

2. Description of the Prior Art

A primary focus and application of the present invention is the field of wireless telecommunications. In digital wireless telecommunications, an analog carrier signal is digitally modulated by a discrete signal at a transmitter, with a corresponding demodulation and detection performed at the receiver following analog-to-digital conversion of the received analog carrier signal. The digital signals comprise an in-phase signal (or 'I', with one example being a cosine waveform) and a quadrature phase signal (or 'Q', with an example being a sine wave), which are amplitude and/or phase modulated with a finite number of amplitudes/phases, and then summed.

A typical transmitter performs the following functions: group the incoming data bits into codewords, one for each symbol that will be transmitted; map (modulate) the codewords to, for example, amplitudes of 'I' and 'Q' signals; oversampling and filtering the digital signal and thereafter digital to analog conversion (DAC) of the 'I' and 'Q' signals and then with reconstruction filter to suppress the unwanted image. A high frequency carrier waveform then frequency translates the modulated signal to a radio frequency (RF) signal for amplification, further filtering and radiation from an antenna.

A typical receiver performs the following functions: band-pass filtering and automatic gain control of a received wireless signal, frequency down-conversion of the RF signal to equivalent intermediate frequency/baseband/digital 'I' and 'Q' signals, by mixing the RF signal with a local oscillator signal, sampling and analog-to-digital conversion (ADC) of the down-converted signal and various signal processing of the down-converted 'I' and 'Q' signals as part of the detection and demodulation process to recover the original transmitted codewords.

Referring to FIG. 1, a known transceiver architecture is illustrated, comprising a receiver 100 and a transmitter 150, shown as distinct circuits for ease of review. The receiver 100 comprises an antenna 102, a low noise amplifier (LNA) 104, two frequency down-conversion quadrature mixers 106, 108, two respective low pass filters (LPFs) 110, 112, two analog-to-digital converters (ADCs) 114, 116 (one for each quadrature path), a combiner 117 arranged to sum the two digital quadrature signals and a baseband (BB) demodulator 118.

Antenna 102 receives a radio frequency (RF) signal, which is fed into the LNA 104. The LNA 104 amplifies the received signal and outputs an amplified signal to each of the frequency down-conversion mixers 106, 108. Frequency down-conversion mixer 106 mixes the amplified signal with a local oscillator signal 107 (I) and outputs the frequency down-converted quadrature signal to low pass filter 110. Similarly, frequency down-conversion mixer 108 mixes the amplified signal with a local oscillator signal 109 (Q) and outputs the frequency down-converted quadrature signal to low pass filter 112. The two local oscillator signals (I) 107 and (Q) 109 are quadrature related (separated in phase by 90°). The low pass filtered signals are input to ADCs 114, 116 respectively, which sample the analog low pass filtered signals at a defined sampling frequency. A digital output from the ADCs 114, 116 is fed via combiner 117 into the BB demodulator 118, e.g. comprising a fast fourier transform (FFT) engine for an orthogonal frequency division multiplex (OFDM) system, which processes the received signal in the digital domain.

In a transmit sense, the transmitter 150 comprises a digital signal processor (DSP) 152, digital-to-analog converters (DACs) 154, 156, LPFs 158, 160, frequency up-conversion mixers 162, 164, power amplifier (PA) 166 and an antenna 168, which may be the same antenna 102 as in the receiver.

In the transmit sense, DSP 152 generates and outputs pairs of digital quadrature signals, which are input to DACs 154, 156. The DACs 154, 156 convert the digital quadrature signals to analog quadrature signals based on their operating sample rate. The resultant analog quadrature signals are input to LPFs 158, 160, which filter out alias components of the analog quadrature signals. Frequency up-conversion mixer 162 mixes the filtered analog quadrature signal with local oscillator signal 163, and frequency up-conversion mixer 164 mixes the filtered analog quadrature signal with local oscillator signal 165. The two resultant mixed signals are combined before being input to power amplifier 166, which amplifies the combined signal prior to transmission.

A known problem with the abovementioned transceiver is the effect of I/Q mismatch, between the respective quadrature paths, which can cause undesirable I/Q imbalance between the two quadrature signal paths. Quadrature mismatch/imbalances are generally caused by one or more of: a gain error between the frequency down-conversion quadrature mixers 106, 108, 162, 164; phase error between the local oscillator signals 107, 109, 163, 165; and any gain error between the ADCs 114, 116 and DACs 154, 156. It is also known that frequency independent parts of the receiver LPFs 110, 112, and the transmitter LPFs 158, 160 also contribute to the gain error. All of these are generally referred to as frequency independent I/Q (FIIQ) mismatch, with the primary contributor typically being due to gain and/or phase mismatch between the quadrature mixers of 'I' and 'Q' channel.

Further, quadrature imbalances may be caused by frequency-response related components, such as gain and/or phase mismatch between LPFs 110, 112, and 158, 160, referred to as frequency dependent I/Q (FDIQ) mismatch. Thus, referring to the receiver 100 and transmitter 150, if the components of, say, receive LPFs 110, 112 and transmit LPFs 158, 160 are not perfectly matched, then a non-zero (e.g. gain and/or phase mismatch between the) transfer functions would contribute to a leaked output component.

Therefore, it may be advantageous to be able to negate or reduce or minimise any transmitter or receiver induced FDIQ mismatch.

SUMMARY

Accordingly, the invention seeks to mitigate, alleviate or eliminate one or more of the above mentioned disadvantages singly or in any combination.

In a first aspect of the invention, a communication unit for determining frequency-dependent quadrature (FDIQ) imbalance is described. The communication unit comprises a quadrature transmitter comprising an input for receiving an encoded quadrature first test signal; and at least one analog transmit filter for filtering the encoded quadrature first test signal. An analog feedback loopback path selectively first routes the filtered encoded quadrature first test signal to a quadrature receiver. The quadrature receiver comprises at least one analog receive filter for further filtering the filtered encoded quadrature first test signal; and a quadrature receive baseband circuit arranged to receive and decode the further filtered encoded quadrature first test signal. The quadrature transmitter is arranged to receive a second test signal and the analog feedback loopback path selectively routes a filtered encoded quadrature second test signal to the quadrature receiver via a different route to the first route and the quadrature receive baseband circuit is arranged to determine a frequency-dependent quadrature imbalance of at least one component in at least one of the transmitter or receiver based on the decoded further filtered encoded quadrature first test signal and the decoded further filtered encoded quadrature second test signal.

In an optional example, the analog feedback loopback path for selectively routing the filtered encoded quadrature test signals may comprise at least one of a switch network, a multiplexer to facilitate the switching between respective transmit 'I'/'Q' and receive 'I'/'Q' paths.

In an optional example, the test signal may comprise a multiple sequential transmission of tones at different frequencies, such that the quadrature receive baseband circuit is arranged to determine a frequency-dependent quadrature imbalance, of at least one component in at least one of the transmitter or receiver, at each of the different frequencies.

In an optional example, the multi tone test signal may comprise tones with equal frequency spacing that are generated from a fast fourier transform at the same time, such that the quadrature receive baseband circuit is arranged to determine a frequency-dependent quadrature imbalance, of at least one component in at least one of the transmitter or receiver, at each of the different frequencies. In this manner, a single (multitone) signal may be employed to calibrate the communication unit for FDIQ determination and compensation.

In an optional example, the communication unit may further comprise a test signal generator, operably coupled to the quadrature transmitter, and arranged to generate the first test signal. In this manner, the communication unit may be arranged to generate its own test signals to calibrate the communication unit for FDIQ determination and compensation.

In an optional example, the first test signal may be the same as the second signal. In this manner, the same test signal can be used for both paths/FDIQ determinations, thereby leading to more accurate results.

In an optional example, the quadrature transmitter further comprises a quadrature transmit baseband circuit arranged to receive and encode the first test signal and provide a quadrature encoded first test signal to the at least one analog transmit filter. In this manner, the transmit baseband circuit may be arranged to process the test signal(s) prior to passing it/them to a frequency-dependent component for subsequent FDIQ determination and compensation.

In an optional example, the first and second test signal may comprise a quadrature digital baseband signal and the communication unit may further comprise a digital to analog conversion circuit, arranged to convert the quadrature digital baseband signal from the quadrature transmit baseband circuit to an analog intermediate frequency (IF) signal comprising quadrature components to route to the at least one analog transmit filter. Similarly, in the receiver an analog to digital conversion circuit may be arranged to convert the loopback analog IF quadrature signal comprising quadrature components to a quadrature digital baseband signal. In this manner, the communication unit may support digital test signal generation and digital processing of FDIQ determination values for analog components that provide a frequency-dependent response. Furthermore, in some examples, analog compensation for analog components that provide a frequency-dependent response may be performed based on digital calculations.

an optional example, the quadrature receive baseband circuit may be operably coupled to an FDIQ compensation module that may be arranged to compensate at least one component or circuit in the communication unit to reduce FDIQ mismatch based on the determined frequency-dependent quadrature imbalance. In some examples, such compensation may be performed on an individual FDIQ mismatch between a plurality of baseband low pass filters.

In an optional example, the FDIQ compensation module may be operable to compensate FDIQ imbalance in a frequency domain or a time domain.

In an optional example, the analog IF loopback path for routing the analog IF signal comprising quadrature components is arranged to couple at least two from: an output from a quadrature 'I' transmit low pass filter to an input of a quadrature 'I' low pass filter in the receiver; an output from a quadrature 'I' transmit low pass filter to an input of a quadrature 'Q' low pass filter in the receiver; an output from a quadrature 'Q' transmit low pass filter to an input of a quadrature 'I' low pass filter in the receiver; an output from a quadrature 'Q' transmit low pass filter to an input of a quadrature 'Q' low pass filter in the receiver.

In a second aspect of the invention, a method for determining frequency-dependent quadrature (FDIQ) imbalance in a communication unit is described. The method comprises: receiving a first quadrature test signal; and filtering the first quadrature test signal; selectively first muting the filtered first quadrature test signal to a quadrature receiver via a first route of an analog feedback loopback path; further filtering the filtered first quadrature test signal; receiving and decoding the further filtered first quadrature test signal; subsequently receiving a second quadrature test signal; filtering the second quadrature test signal; selectively muting a filtered second quadrature test signal to a quadrature receiver via a second route different from the first route; and determining a frequency-dependent quadrature imbalance of at least one component in at least one of a transmitter or receiver based on the decoded further filtered first quadrature test signal and the decoded further filtered second quadrature test signal.

In a third aspect of the invention, an integrated circuit for a communication unit for determining frequency-dependent quadrature (FDIQ) imbalance is described. The integrated circuit comprises a quadrature transmitter comprising: a quadrature transmit baseband circuit arranged to receive a first quadrature test signal; and at least one analog transmit filter for filtering the first quadrature test signal. An analog feedback loopback path selectively first routes the filtered first quadrature test signal to a quadrature receiver via a first route. The quadrature receiver comprises: at least one analog receive filter for further filtering the filtered first quadrature test signal; and a quadrature receive baseband circuit arranged to receive and decode the further filtered first quadrature test signal; wherein the quadrature transmitter is arranged to subsequently receive a second quadrature test signal and the analog feedback loopback path selectively routes a filtered second quadrature test signal to the quadrature receiver via a second route that is different from the first route such that the quadrature receive baseband circuit is arranged to determine a frequency-dependent quadrature imbalance of at least one component in at least one of the transmitter or receiver based on a decoded further filtered first quadrature test signal and the decoded further filtered second quadrature test signal.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

Figure 1:
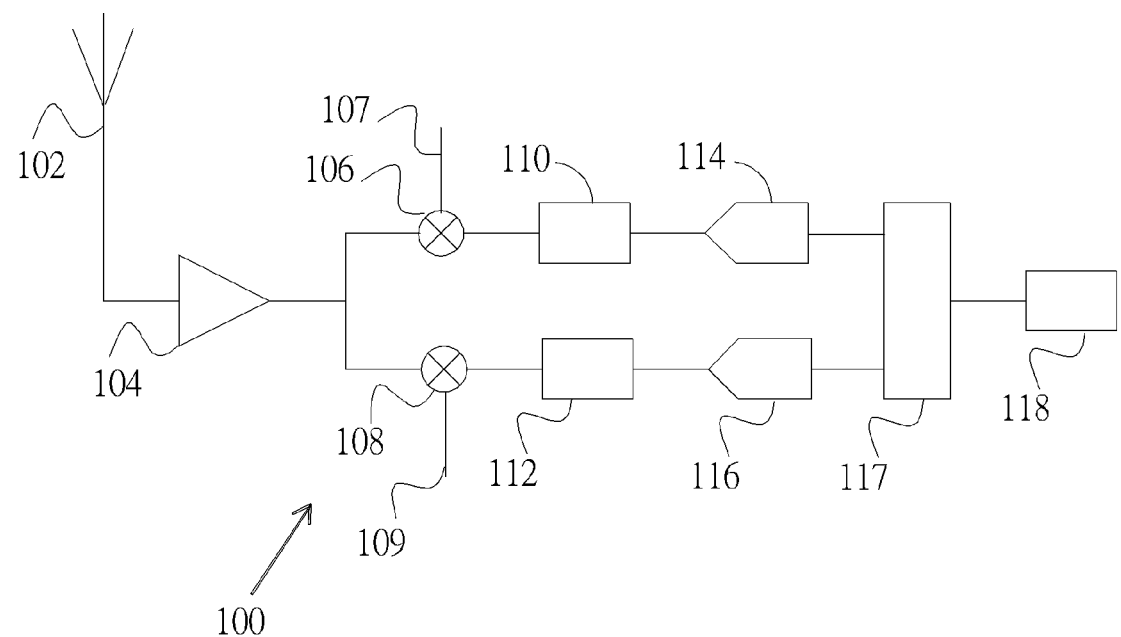
FIG. 1 illustrates a known transceiver architecture.
Figure 1:
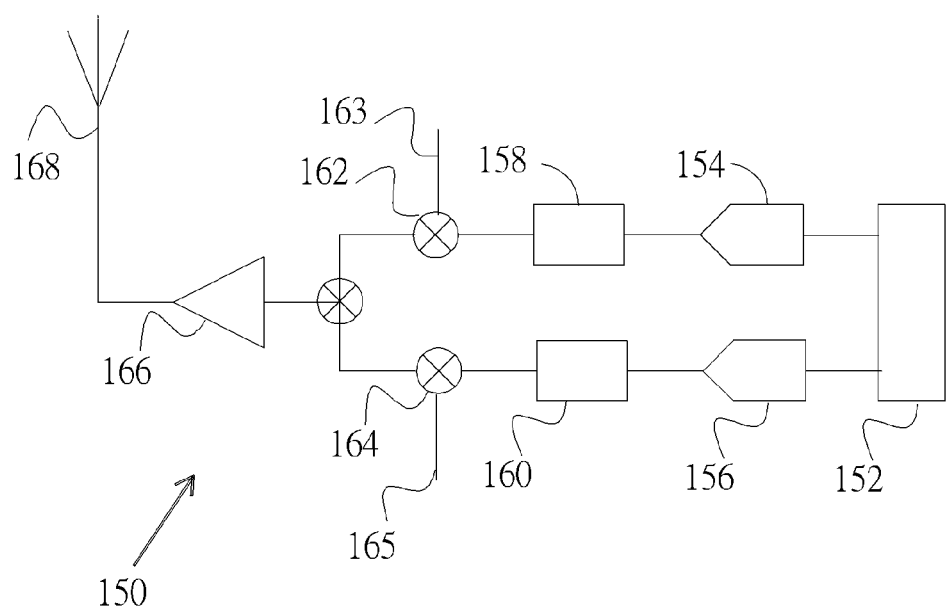

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In examples of the invention, a loopback path (notably at baseband or an intermediate frequency (IF)) is introduced into a communication unit to directly couple a transmit analog low pass filter (LPF) to a receive analog LPF, thereby bypassing the up-conversion/down-conversion mixers. One benefit of introducing such a loopback path is to remove/reduce any possible (and significant) effect from FIIQ mismatch contributed by other components in the communication unit, for example any gain/phase mismatch of quadrature mixers.

By coupling the transmit LPF and receive LPF in the manner claimed, any FDIQ mismatch determination, for example resulting from a combination of both transmit LPF and receive LPF elements and/or other frequency dependent circuits, may be isolated from the typical FIIQ contributors. In some examples, the total FDIQ contribution from all components prior to the up/down conversion quadrature mixers may be determined. The inventors have determined that the primary FDIQ contribution emanates from the transmit LPF and receive LPF.

Therefore, in some examples, a mechanism to separate the FDIQ contribution emanating from both the transmit LPF and receive LPF may be achieved by performing two or more test routines. In this regards, a switching network is introduced into the baseband or IF loopback path in order to selectively route a quadrature test signal from one or more of the transmit (baseband) 'I' or 'Q' paths to one or more of the receive (baseband) 'I' or 'Q' paths. Calculations performed on both runs of the test signal, thereby facilitate a mechanism to separate the contributed FDIQ mismatch between, say the respective transmit LPF and receive LPF. In some examples, the switching network may comprise a number of single-pole multiple-throw switches or multiple-pole multiple-throw switches. In some examples, the switching network may comprise a number of active circuits or components capable of routing signals in a number of different paths. In other examples, a multiplexer may be employed instead of a switching network.

As a consequence thereof, individual FDIQ mismatch contributed by the respective transmit LPF and/or receive LPF can be compensated for. In particular, such compensation of individual FDIQ mismatch may take into account any mismatch between respective baseband LPFs of the quadrature (I/Q) paths. Furthermore, such compensation may be implemented in either the frequency domain and/or the time domain.

Figure 3:
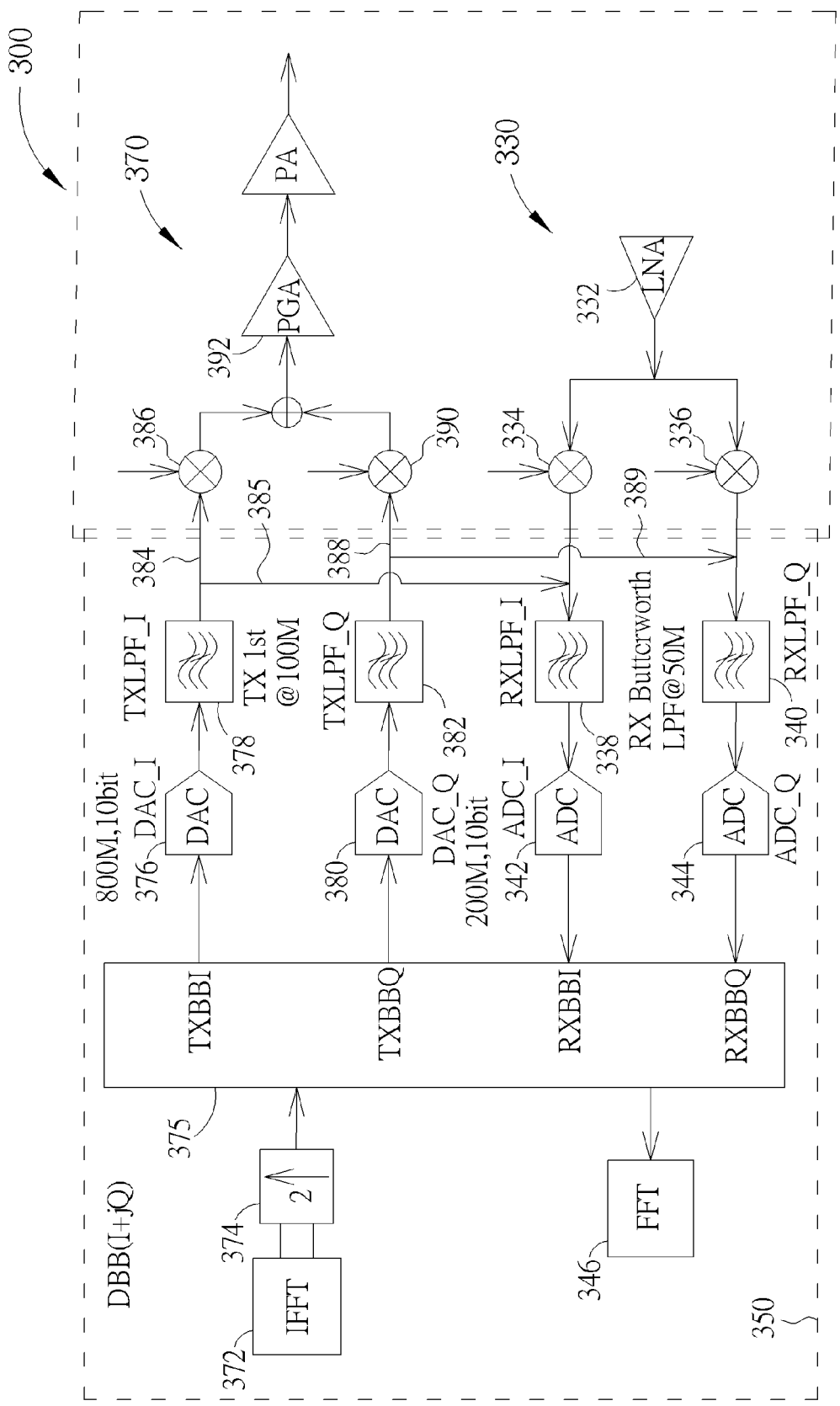
FIG. 3 illustrates a block diagram of a first example of an analog IF loopback circuit to calibrate and compensate for FDIQ imbalance according to aspects of the invention.

In some examples, as illustrated in the first example of an analog IF loopback circuit of FIG. 3, a transmit 'I' path (TxI) is coupled to a receive 'I' path (RxI) and a transmit 'Q' path (TxQ) is coupled to a receive 'O' path (RxQ). In some examples, as illustrated in the second example of an analog IF loopback circuit of FIG. 4, a TxI path is coupled to a RxQ path and a TxQ path is coupled to a RxI path. In some examples, as illustrated in the third example of an analog IF loopback circuit of FIG. 5, a TxI path is coupled to a RxI path and a TxQ path is also coupled to a RxI path. In some examples, as illustrated in the third example of an analog IF loopback circuit of FIG. 6, a TxI path is coupled to a RxI path and a TxI path is also coupled to a RxQ path.

Figure 2:
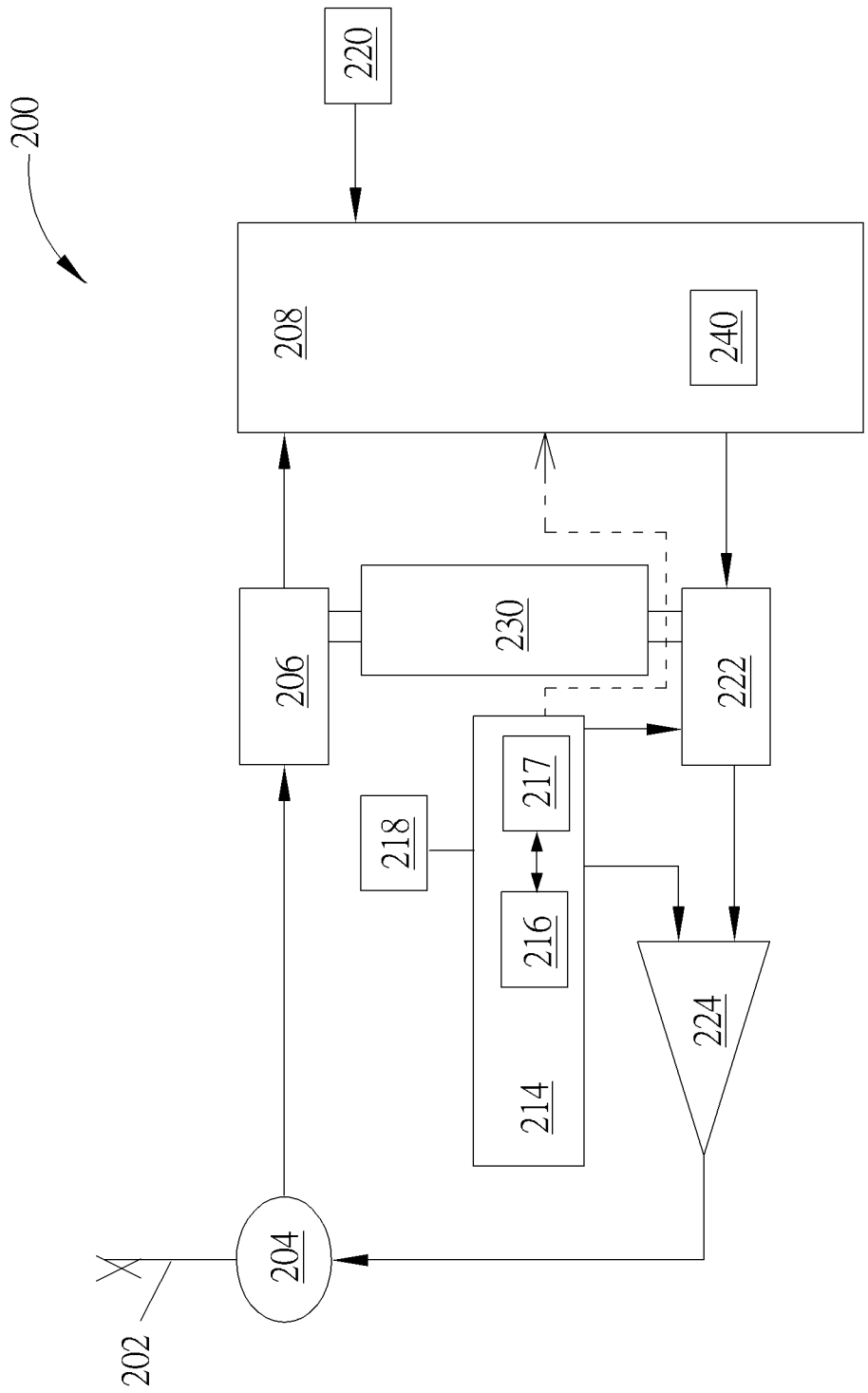
FIG. 2 illustrates a block diagram of a wireless communication unit, adapted in accordance with some example embodiments of the invention.

Referring now to FIG. 2, a block diagram of a wireless communication unit 200, adapted in accordance with some example embodiments of the invention, is shown. The wireless communication unit 200 contains an antenna 202, for receiving transmissions, coupled to an antenna switch or duplexer 204 that provides isolation between receive and transmit chains within the wireless communication unit 200. One or more receiver chains, as known in the art, include receiver front-end circuitry 206 (effectively providing reception, filtering and intermediate or base-band frequency conversion). The receiver front-end circuitry 206 is coupled to a signal processing module 208 (generally realized by a digital signal processor (DSP)). A skilled artisan will appreciate that the level of integration of receiver circuits or components may be, in some instances, implementation-dependent.

The controller 214 maintains overall operational control of the wireless communication unit 200. The controller 214 is also coupled to the receiver front-end circuitry 206 and the signal processing module 208. In some examples, the controller 214 is also coupled to a buffer module 217 and a memory device 216 that selectively stores operating regimes, such as decoding/encoding functions, synchronization patterns, code sequences, and the like. A timer 218 is operably coupled to the controller 214 to control the timing of operations (e.g. transmission or reception of time-dependent signals) within the wireless communication unit 200.

As regards the transmit chain, this essentially includes an input module 220, coupled in series through transmitter/modulation circuitry 222 and a power amplifier 224 to the antenna 202, antenna array, or plurality of antennas. The transmitter/modulation circuitry 222 and the power amplifier 224 are operationally responsive to the controller 214.

The signal processor module 208 in the transmit chain may be implemented as distinct from the signal processor in the receive chain. Alternatively, a single processor may be used to implement a processing of both transmit and receive signals, as shown in FIG. 2. Clearly, the various components within the wireless communication unit 200 can be realized in discrete or integrated component form, with an ultimate structure therefore being an application-specific or design selection.

In accordance with example embodiments of the present invention, an analog or intermediate frequency quadrature feedback path 230 has been introduced between at least one transmit low pass filter in the transmitter path, e.g. transmitter/modulation circuitry 222 and at least one receive low pass filter in the receiver path, e.g. receiver front-end circuitry 206. Furthermore, in accordance with example embodiments of the present invention, signal processor module 208 has been adapted to provide at least some compensation for frequency-dependent I-Q mismatch, as described further with respect to later figures. Furthermore, in accordance with example embodiments of the present invention, a test generator 240, for example a multi tone test generator, is provided that is arranged to generate a test signal to enable the communication unit to calibrate and compensate for FDIQ quadrature mismatch/imbalance.

Referring to FIG. 3, an example of a block diagram 300 of a first example of an analog IF loopback circuit to calibrate and compensate for FDIQ imbalance, is illustrated. The first example of an analog IF loopback circuit comprises receiver circuit 330 and transmitter circuit 370. In the first example of an analog IF loopback circuit of FIG. 3, a transmit 'I' path (TxI) is coupled to receive 'I' path (RxI) and a transmit 'Q' path (TxQ) is coupled to receive 'Q' path (RxQ). In the illustrated example, the baseband/digital and IF circuits/components are provided within an integrated circuit 350. Those skilled in the art will recognize that the functional blocks and/or logic elements herein described may be implemented in a different form, with the integrated circuit comprising more or less circuits/components in other implementations.

The transmitter circuit 370 comprises an inverse fast Fourier transform (IFFT) module 372, operably coupled to an interpolation module 374 that provides an interpolated digital signal to a baseband quadrature multiplexer 375. A first quadrature (I) output from the baseband quadrature multiplexer 375 is input to a first digital to analog converter (I) 376, and the analog output transmit signal is input to a first transmit low pass filter 378. A second quadrature (Q) output from the baseband quadrature multiplexer 375 is input to second digital to analog converter (Q) 380, and the analog output transmit signal is input to a second transmit low pass filter 382.

A quadrature transmit intermediate frequency (IF) signal 384 output from the first low pass filter 378 is subsequently input to frequency up-conversion quadrature mixer 386, which is operable to mix quadrature transmit IF signal 384 with a first quadrature local oscillator signal (I). Similarly, quadrature transmit IF signal 388 output from the second low pass filter 382 is input to frequency up-conversion quadrature mixer 390, which is operable to mix quadrature transmit IF signal 388 with a further second quadrature local oscillator signal (Q). The two outputted signals from mixers 386 (I) and 390 (Q) are quadrature related, and combined before being input to a programmable gain amplifier (PGA) 392 and power amplifier 394.

The receiver circuit 330 comprises a low noise amplifier (LNA) 332, which receives and amplifies a radio frequency signal and provides the amplified RF signal to first and second frequency down-conversion quadrature mixers 334, 336. The quadrature output signals from frequency down-conversion quadrature mixers 334, 336 are coupled to respective receive low pass IF filters 338, 340 before being input to respective analog-to-digital converters (ADCs) 342, 344. The resultant quadrature digital signals are combined in baseband quadrature multiplexer 375, before being input to a fast Fourier transform module 346.

In this first example, filtered quadrature IF signals 384, 388 from the transmitter 370, are coupled to the respective quadrature IF path in the receiver 330, for example transmit 'I' path (TxI) is coupled to the corresponding receive 'I' path (RxI) and the transmit 'Q' path (TxQ) is coupled to the corresponding receive 'Q' path (RxQ) via feedback paths 385, 389 respectively.

In some examples, the filtered quadrature IF signals 384, 388 may be calibration signals, utilised by FFT module 346 to calculate FDIQ imbalance in the frequency domain.

In this example, during a calibration phase, the transmitted IF (I) signal 384 is fed to the quadrature (I) receiver path via an analog IF loopback path 385 with no signal being passed from the LNA 332 to the frequency down-conversion mixer 334. Similarly, the transmitted IF (Q) signal 388 is fed to the quadrature (Q) receiver path via the analog IF loopback path 389 with no signal being passed from the LNA to the frequency down-conversion mixer 336. In this manner, a first calibration of frequency-dependent IQ (FDIQ) mismatch, caused by a combination of transmit low pass filters 378, 382 and receive low pass IF filters 338, 340 can be made.

In some examples, a fast fourier transform engine may generate a multi tone signal in order to facilitate FDIQ imbalance determination/calibration. Since the FDIQ mismatch is, by definition, 'frequency dependent', the parameters are varying and preferably calibrated over a frequency range. Therefore, in some examples, the aforementioned calibration is performed using multi tones. For example, a first multi tone approach employs transmitting tones at different frequencies sequentially, and calculating the FDIQ mismatch parameters, at each frequency, one by one. A second multi tone example employs transmitting an OFDM-like multi-tone signal and calculating the parameters in parallel.

A formula derivation for a multi tone signal to determine FDIQ imbalance for the configuration of FIG. 3, based on transmitting a OFDM-like multi-tone and calculating the parameters in parallel, is described below.

Formula Derivation of Multi Tone Transmit Signal to Determine FDIQ Imbalance in FIG. 3

$$\begin{bmatrix} r_I(t - \tau_{TX} - \tau_{RX}) \\ r_Q(t + \tau_{TX} + \tau_{RX}) \end{bmatrix} = \quad [1], [2], [3]$$

$$\begin{bmatrix} h_{TXI}(t - \tau_{TX} - \tau_{RX}) \otimes h_{RXI}(t - \tau_{TX} - \tau_{RX}) \otimes \cos\omega_k t \\ h_{TXQ}(t + \tau_{TX} + \tau_{RX}) \otimes h_{RXQ}(t + \tau_{TX} + \tau_{RX}) \otimes \sin\omega_k t \end{bmatrix} \Rightarrow \begin{bmatrix} r_I(t) \\ r_Q(t) \end{bmatrix} =$$

$$\begin{bmatrix} h_{TXI}(t) \otimes h_{RXI} \otimes \cos\omega_k(t + \tau_{TX} + \tau_{RX}) \\ h_{TXQ}(t) \otimes h_{RXQ} \otimes \sin\omega_k(t - \tau_{TX} - \tau_{RX}) \end{bmatrix} \xrightarrow{\text{Frequency Domain}}$$

$$\begin{bmatrix} H_{TXI}[k]H_{RXI}[k](\cos(\omega_k(t + (\tau_{TX} + \tau_{RX})))) \\ H_{TXQ}[k]H_{RXQ}[k](\sin(\omega_k(t - (\tau_{TX} + \tau_{RX})))) \end{bmatrix} =$$

$$\begin{bmatrix} |H_{TXI}[k]||H_{RXI}[k]|(\cos(\omega_k(t + (\tau_{TX} + \tau_{RX})) + \phi_{TX}[k] + \phi_{RX}[k])) \\ |H_{TXQ}[k]||H_{RXQ}[k]|(\sin(\omega_k(t - (\tau_{TX} + \tau_{RX})) - \phi_{TX}[k] - \phi_{RX}[k])) \end{bmatrix}$$

Where:

$\tau_{TX}$ and $\tau_{RX}$ represent the delay between I and Q path in TX and RX IF circuits $|H_{RXI}|[k]$ $h_{TXI}$ and $h_{TXQ}$ are the impulse response of TX I and Q LPF;

$h_{RXI}$ and $h_{RXQ}$ are the impulse response of RX I and Q LPF;

$\omega_k$ is one frequency of, say, a multi tone test signal that can be used in this example;

$|H_{TXI}|[k]$ and $|H_{TXQ}|[k]$ represent TX I and Q LPF magnitude response at k-th frequency; and $|H_{RXI}|[k]$ and $|H_{RXQ}|[k]$ represent RX I and Q LPF magnitude response at k-th frequency;

Simplifying equations [1]-[3]:

$$r(t) = r_I(t) + jr_Q(t) = \quad [4], [5], [6]$$
$$|H_{TXI}[k]||H_{RXI}[k]|(\cos(\omega_k(t + (\tau_{TX} + \tau_{RX})) + \phi_{TX}[k] + \phi_{RX}[k])) +$$
$$j|H_{TXQ}[k]||H_{RXQ}[k]|(\sin(\omega_k(t - (\tau_{TX} + \tau_{RX})) - \phi_{TX}[k])) =$$
$$\cos\omega_k t[|H_{TXI}[k]||H_{RXI}[k]|\cos(\omega_k(\tau_{TX} + \tau_{RX}) + \phi_{TX}[k] + \phi_{RX}[k]) -$$
$$j|H_{TXQ}[k]||H_{RXQ}[k]|\sin(\omega_k(\tau_{TX} + \tau_{RX}) + \phi_{TX}[k] + \phi_{RX}[k])] +$$
$$j\sin\omega_k t[|H_{TXQ}[k]||H_{RXQ}[k]|\cos(\omega_k(\tau_{TX} + \tau_{RX}) + \phi_{TX}[k] + \phi_{RX}[k]) +$$
$$j|H_{TXI}[k]||H_{RXI}[k]|\sin(\omega_k(\tau_{TX} + \tau_{RX}) + \phi_{TX}[k] + \phi_{RX}[k])]a_I[k]\cos\omega_k t +$$
$$ja_Q[k]\sin\omega_k t$$

-continued $$r(t) = a_I[k]\cos\omega_k t + ja_Q[k]\sin\omega_k t = \quad [7], [8]$$
$$a_I[k]\frac{e^{j\omega_k t} + e^{-j\omega_k t}}{(2)} + ja_Q[k]\frac{e^{j\omega_k t} - e^{-j\omega_k t}}{(2j)} \Rightarrow R[k] = \frac{a_I[k] + a_Q[k]}{(2)},$$

$$R[-k] = \frac{a_I[k] - a_Q[k]}{(2)}$$

$$\begin{bmatrix} R[k] \\ R[-k] \end{bmatrix} = \frac{1}{2}\begin{bmatrix} a_I[k] + a_Q[k] \\ a_I[k] - a_Q[k] \end{bmatrix} \quad [9], [10], [11]$$

$$\begin{bmatrix} R[k] + R^*[-k] \\ R[k] - R^*[-k] \end{bmatrix} = \begin{bmatrix} \text{Re}(a_I[k]) + j\text{Im}(a_Q[k]) \\ j\text{Im}(a_I[k]) + \text{Re}(a_Q[k]) \end{bmatrix} = \begin{bmatrix} \text{Re}(a_I[k]) + j\text{Im}(a_Q[k]) \\ j\text{Im}(a_I[k]) + \text{Re}(a_Q[k]) \end{bmatrix} =$$

$$\begin{bmatrix} |H_{TXI}[k]||H_{RXI}[k]|e^{j(\omega_k(\tau_{TX}+\tau_{RX})+\phi_{TX}[k]+\phi_{RX}[k])} \\ |H_{TXQ}[k]||H_{RXQ}[k]|e^{j(\omega_k(\tau_{TX}+\tau_{RX})+\phi_{TX}[k]+\phi_{RX}[k])} \end{bmatrix} == \begin{bmatrix} Y_I[k] \\ Y_Q[k] \end{bmatrix}$$

Thus, in this manner, a first calibration/determination of frequency-dependent IQ (FDIQ) mismatch for '$Y_I$' and '$Y_Q$', caused by a combination of transmit low pass filters 378, 382 and receive low pass IF filters 338, 340, can be made. In accordance with examples of the invention, an additional determination of FDIQ mismatch for '$Y_I$' and '$Y_Q$', caused by a combination of transmit low pass filters 378, 382 and receive low pass IF filters 338, 340, can be made by switching in a different IF path and repeating the measurement(s). In this regard, with an additional determination of FDIQ mismatch for '$Y_I$' and '$Y_Q$', it is possible to separate the FDIQ mismatch individually contributed from the Tx LPF and Rx LPF respectively.

Figure 8:
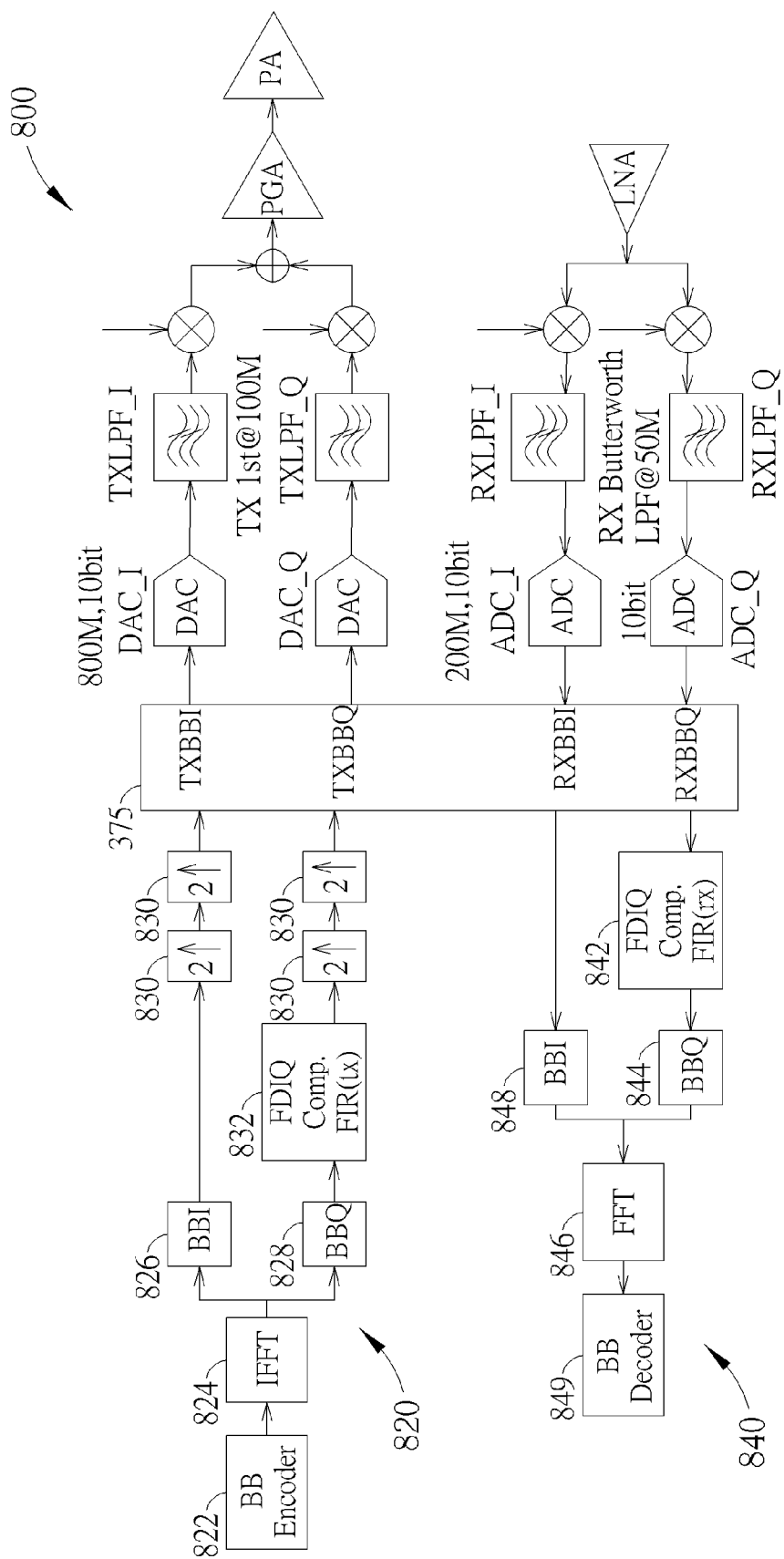
FIG. 8 illustrates a block diagram of a simplified frequency-dependent quadrature imbalance calculation and compensation circuit in the time domain utilising aspects of the invention.
Figure 9:
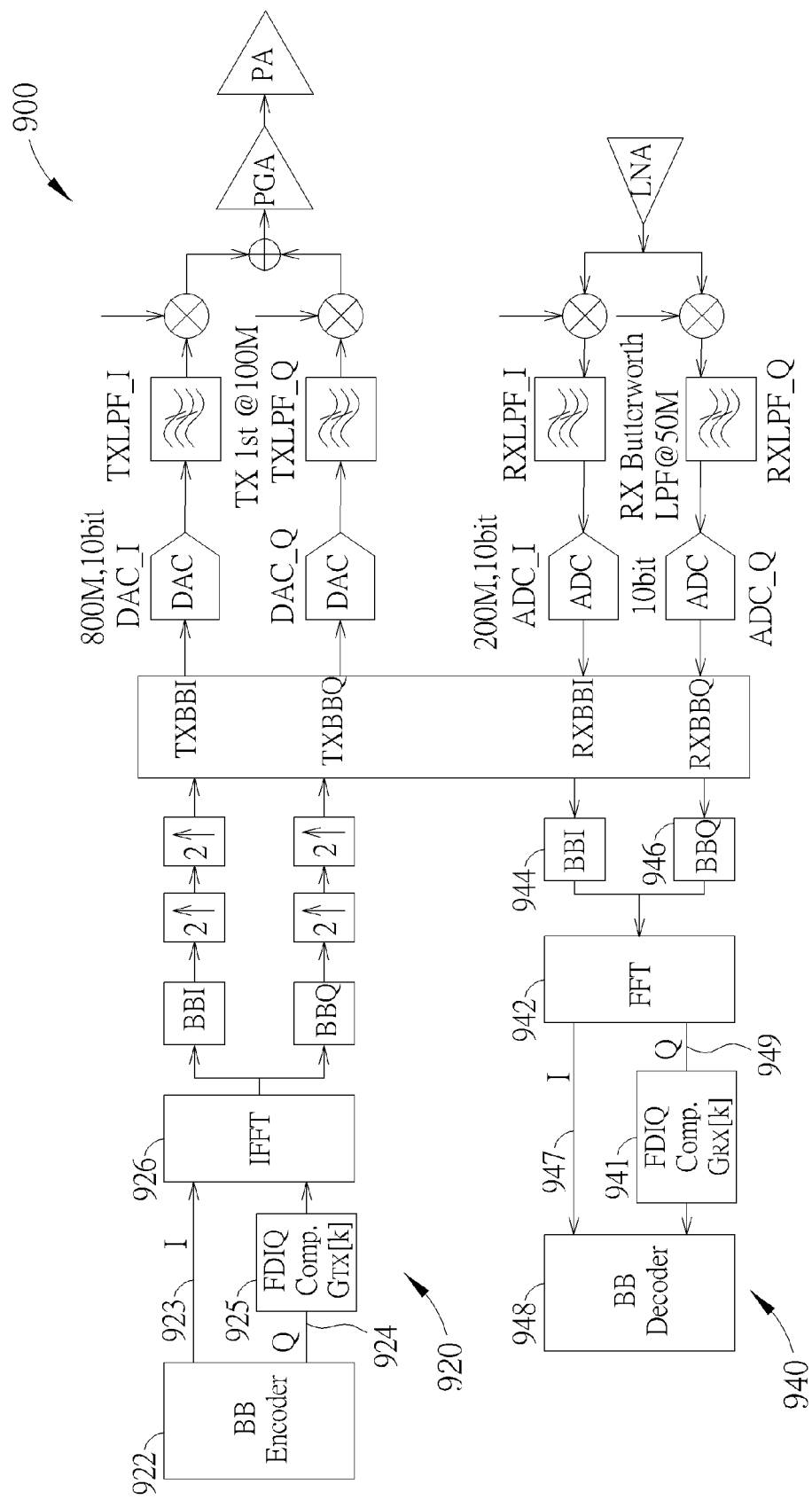
FIG. 9 illustrates a block diagram of a simplified frequency-dependent quadrature imbalance calculation and compensation circuit in the frequency domain utilising aspects of the invention.

Based on the determined FDIQ imbalance, compensation may be employed, as described with respect to FIG. 8 and FIG. 9.

Figure 4:
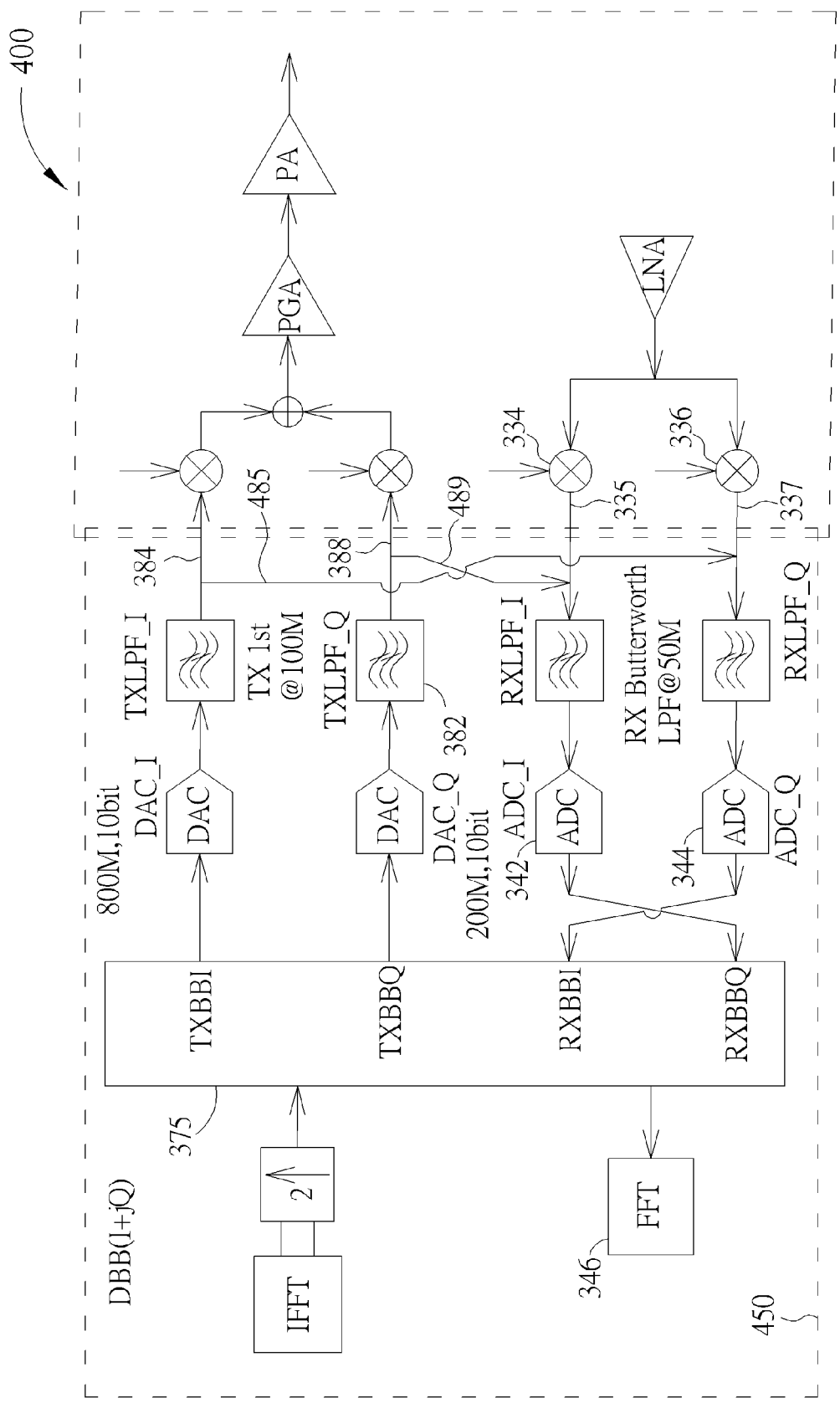
FIG. 4 illustrates a block diagram of a second example of an alternative analog IF loopback circuit to calibrate and compensate for FDIQ imbalance according to aspects of the invention.

Referring to FIG. 4, a further example of a block diagram 400 of a second example of an analog IF loopback circuit to calibrate and compensate for FDIQ imbalance is illustrated. Again, in some examples, a fast fourier transform engine may generate a multi tone signal in order to facilitate FDIQ imbalance determination/calibration with receiver quadrature signal swap. Thus, in the second example of an analog IF loopback circuit of FIG. 4, a TxI path is coupled to a RxQ path and a TxQ path is coupled to a RxI path. In this example block diagram 400, much of the architecture is similar to that described in FIG. 3, and therefore only differences there between will be explained in detail. In the illustrated example, the baseband/digital and IF circuits/components are provided within an integrated circuit 450. Those skilled in the art will recognize that the functional blocks and/or logic elements herein described may be implemented in a different form, with the integrated circuit comprising more or less circuits/components in other implementations.

In this second example, during a calibration phase, the transmitted IF (I) signal 384 is fed to the quadrature (Q) receiver path via an analog IF loopback path 485 with no signal being passed from the LNA to the frequency down-conversion mixer 334. Similarly, the transmitted IF (Q) signal 388 is fed to the quadrature (I) receiver path via the analog IF loopback path 489 with no signal being passed from the LNA to the frequency down-conversion mixer 336.

Therefore, the transmit IF feedback signals, provided by analog IF loopback path 489 and analog IF loopback path 485 are routed through ADCs 342, 344 and input to FFT 346.

Formula Derivation of Multi Tone Receive Signal to Determine FDIQ Imbalance in FIG. 4

A formula derivation for a multi tone signal to determine FDIQ imbalance, with a receiver IQ-path switch, is illustrated below:

$$\begin{bmatrix} r_I(t-\tau_{TX}-\tau_{RX}) \\ r_Q(t+\tau_{TX}+\tau_{RX}) \end{bmatrix} = \quad [13], [14], [15]$$

$$\begin{bmatrix} h_{TXI}(t-\tau_{TX}+\tau_{RX})\otimes h_{RXQ}(t-\tau_{TX}+\tau_{RX})\otimes\cos\omega_k t \\ h_{TXQ}(t+\tau_{TX}-\tau_{RX})\otimes h_{RXI}(t+\tau_{TX}-\tau_{RX})\otimes\sin\omega_k t \end{bmatrix} \Rightarrow$$

$$\begin{bmatrix} r_I(t) \\ r_Q(t) \end{bmatrix} = \begin{bmatrix} h_{TXI}(t)\otimes h_{RXQ}\otimes\cos\omega_k(t+\tau_{TX}-\tau_{RX}) \\ h_{TXQ}(t)\otimes h_{RXI}\otimes\sin\omega_k(t-\tau_{TX}+\tau_{RX}) \end{bmatrix} \xrightarrow{\text{Frequency Domain}}$$

$$\begin{bmatrix} H_{TXI}[k]H_{RXQ}[k](\cos(\omega_k(t+(\tau_{TX}-\tau_{RX})))) \\ H_{TXQ}[k]H_{RXI}[k](\sin(\omega_k(t-(\tau_{TX}-\tau_{RX})))) \end{bmatrix} =$$

$$\begin{bmatrix} |H_{TXI}[k]||H_{RXQ}[k]|(\cos(\omega_k(t+(\tau_{TX}-\tau_{RX}))+\phi_{TX}[k]+\phi_{RX}[k])) \\ |H_{TXQ}[k]||H_{RXI}[k]|(\sin(\omega_k(t-(\tau_{TX}-\tau_{RX}))-\phi_{TX}[k]-\phi_{RX}[k])) \end{bmatrix}$$

[16], [15], [17]

$$r'(t) = r'_I(t) + jr'_Q(t) = |H_{TXI}[k]||H_{RXQ}[k]|(\cos(\omega_k(t+(\tau_{TX}-\tau_{RX})) +$$
$$\phi_{TX}[k]-\phi_{RX}[k])) + j|H_{TXQ}[k]||H_{RXI}[k]|(\sin(\omega_k(t-(\tau_{TX}-\tau_{RX})) -$$
$$\phi_{TX}[k]+\phi_{RX}[k])) = \cos\omega_k t[|H_{TXI}[k]||H_{RXQ}[k]|\cos(\omega_k(\tau_{TX}-\tau_{RX}) +$$
$$\phi_{TX}[k]-\phi_{RX}[k]) - j|H_{TXQ}[k]||H_{RXI}[k]|\sin(\omega_k(\tau_{TX}-\tau_{RX}) + \phi_{TX}[k] -$$
$$\phi_{RX}[k] + j\sin\omega_k t[|H_{TXQ}[k]||H_{RXI}[k]|\cos(\omega_k(\tau_{TX}-\tau_{RX}) + \phi_{TX}[k] -$$
$$\phi_{RX}[k]) + j|H_{TXI}[k]||H_{RXQ}[k]|\sin(\omega_k(\tau_{TX}-\tau_{RX}) + \phi_{TX}[k] - \phi_{RX}[k])] =$$
$$a'_I[k]\cos\omega_k t + ja'_Q[k]\sin\omega_k t$$

[19], [20]

$$r'(t) = a'_I[k]\cos\omega_k t + ja'_Q[k]\sin\omega_k t =$$
$$a'_I[k]\frac{e^{j\omega_k t}+e^{-j\omega_k t}}{2} + ja'_Q[k]\frac{e^{j\omega_k t}-e^{-j\omega_k t}}{2j} \Rightarrow R'[k] = \frac{a'_I[k]+a'_Q[k]}{2},$$
$$R'[-k] = \frac{a'_I[k]-a'_Q[k]}{2}$$

[21], [22], [23]

$$\begin{bmatrix} R'[k] \\ R'[-k] \end{bmatrix} = \frac{1}{2}\begin{bmatrix} a'_I[k]+a'_Q[k] \\ a'_I[k]-a'_Q[k] \end{bmatrix}$$

$$\begin{bmatrix} R'[k]+R'^*[-k] \\ R'[k]-R'^*[-k] \end{bmatrix}\begin{bmatrix} \text{Re}(a'_I[k])+j\text{Im}(a'_Q[k]) \\ j\text{Im}(a'_I[k])+\text{Re}(a'_Q[k]) \end{bmatrix}\begin{bmatrix} \text{Re}(a'_I[k])+j\text{Im}(a'_Q[k]) \\ j\text{Im}(a'_I[k])+\text{Re}(a'_Q[k]) \end{bmatrix} =$$

$$\begin{bmatrix} |H_{TXI}[k]||H_{RXI}[k]|e^{j(\omega_k(\tau_{TX}-\tau_{RX})+\phi_{TX}[k]-\phi_{RX}[k])} \\ |H_{TXQ}[k]||H_{RXQ}[k]|e^{j(\omega_k(\tau_{TX}-\tau_{RX})+\phi_{TX}[k]-\phi_{RX}[k])} \end{bmatrix} == \begin{bmatrix} Y'_I[k] \\ Y'_Q[k] \end{bmatrix}$$

Thus, in this manner, the multi tone signals may be analysed to determine the desired compensation matrix values to be applied to the digital filter in the time domain, namely $Y_I'[k]$ and $Y_Q'[k]$.

Thus, by switching the loopback signal in two distinct ways, via switching network or a multiplexer, it is possible to separate the contribution of FDIQ mismatch from both the Tx LPF and Rx LPF. In one example, the same multitone/calibration signal may be transmitted twice, for example once through the analog IF feedback paths in FIG. 3, and once through the analog IF feedback paths in FIG. 4. Thereafter, it is possible to use the two results ($Y_I Y_Q$ from FIG. 3 and $Y_I'$ $Y_Q'$ from FIG. 4) to obtain the Tx and Rx FDIQ parameter ($G_{Tx}, G_{Rx}$), according to equations [24. 25].

$$G_{RX}[k] = \frac{Y_I[k]}{Y'_I[k]} = \frac{|H_{RXI}[k]|}{|H_{RXQ}[k]|}e^{2j(\omega_k\tau_{RX}+\phi_{RX}[k])} \quad [24], [25]$$

$$G_{TX}[k] = \frac{Y_I[k]}{Y_Q[k]} \Big/ G_{RX}[k] = \frac{|H_{TXI}[k]|}{|H_{TXQ}[k]|}e^{2j(\omega_k\tau_{TX}+\phi_{TX}[k])}$$

Once the Tx and Rx FDIQ parameters [24, 25] have been determined, suitable adjustments, e.g. compensation values, may be applied to the digital filter in the time domain in order to compensate for FDIQ imbalance, for example as described later with respect to FIG. 8 and FIG. 9.

Figure 5:
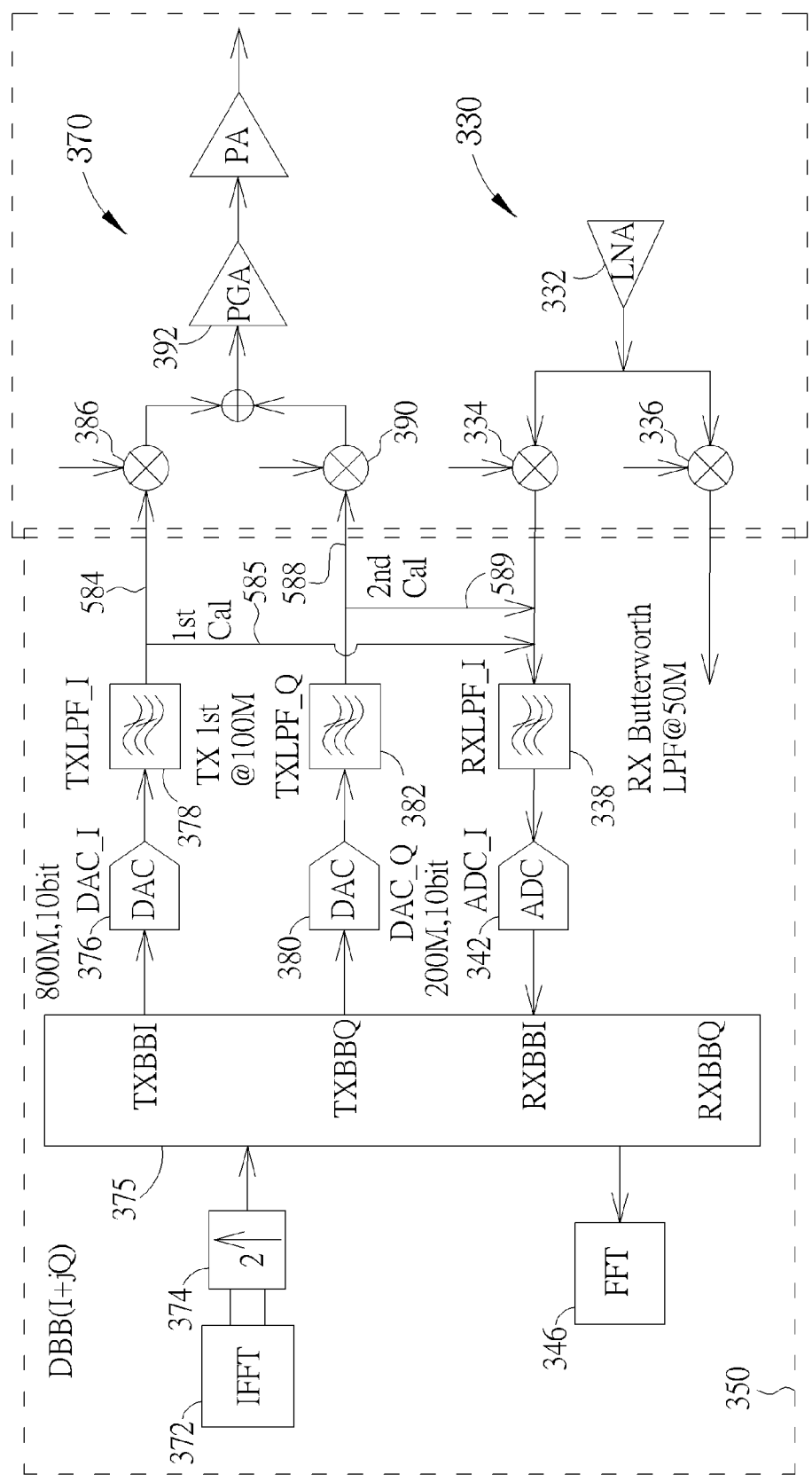
FIG. 5 illustrates a block diagram of a third example of an alternative analog IF loopback circuit to calibrate and compensate for FDIQ imbalance according to aspects of the invention.

FIG. 5 illustrates a block diagram of a third example of an analog IF loopback circuit to calibrate and compensate for FDIQ imbalance is illustrated, according to aspects of the invention. In the third example of an analog IF loopback circuit of FIG. 5, a TxI path is coupled to a RxI path and a TxQ path is also coupled to a RxI path via feedback paths 585, 589 respectively. In other respects, the same architecture of FIG. 3 can be re-used, so will not be re-described in any greater detail than necessary so as not to obfuscate the description of example embodiments of the invention. In the illustrated example, the baseband/digital and IF circuits/components are provided within an integrated circuit 550. Those skilled in the art will recognize that the functional blocks and/or logic elements herein described may be implemented in a different form, with the integrated circuit comprising more or less circuits/components in other implementations.

Formula Derivation of Multi Tone Transmit Signal to Determine FDIQ Imbalance in FIG. 5

[26], [27], [28]

$$\begin{bmatrix} r_I(t-\tau_{TX}) \\ r_Q(t+\tau_{TX}) \end{bmatrix} = \begin{bmatrix} h_{TXI}(t-\tau_{TX})\otimes\cos\omega_k t \\ h_{TXQ}(t+\tau_{TX})\otimes\sin\omega_k t \end{bmatrix} \Rightarrow \begin{bmatrix} r_I(t) \\ r_Q(t) \end{bmatrix} =$$

$$\begin{bmatrix} h_{TXI}(t)\otimes\cos\omega_k(t+\tau_{TX}) \\ h_{TXQ}(t)\otimes\sin\omega_k(t-\tau_{TX}) \end{bmatrix} \xrightarrow{\text{Frequency Domain}} \begin{bmatrix} H_{TXI}[k](\cos(\omega_k(t+\tau_{TX}))) \\ H_{TXQ}[k](\sin(\omega_k(t-\tau_{TX}))) \end{bmatrix} =$$

$$\begin{bmatrix} |H_{TXI}[k]|(\cos(\omega_k(t+\tau_{TX})+\phi_{TX}[k])) \\ |H_{TXQ}[k]|(\sin(\omega_k(t-\tau_{TX})-\phi_{TX}[k])) \end{bmatrix}$$

Simplifying equations [26]-[28]:

[29], [30], [31]

$$r(t) = r_I(t)+jr_Q(t) = |H_{TXI}[k]|(\cos(\omega_k(t+\tau_{TX})+\phi_{TX}[k])) +$$
$$j|H_{TXQ}[k]|(\sin(\omega_k(t-\tau_{TX})-\phi_{TX}[k])) =$$
$$\cos\omega_k t[|H_{TXI}[k]|\cos(\omega_k\tau_{TX}+\phi_{TX}[k]) -$$
$$j|H_{TXQ}[k]|\sin(\omega_k\tau_{TX}+\phi_{TX}[k])] +$$
$$j\sin\omega_k t[|H_{TXQ}[k]|\cos(\omega_k\tau_{TX}+\phi_{TX}[k]) + j|H_{TXI}[$$
$$k]|\sin(\omega_k\tau_{TX}+\phi_{TX}[k])] = a_I[k]\cos\omega_k t + ja_Q[k]\sin\omega_k t$$

[32], [33]

$$r(t) = a_I[k]\cos\omega_k t + ja_Q[k]\sin\omega_k t =$$
$$a_I[k]\frac{e^{j\omega_k t}+e^{-j\omega_k t}}{2} + ja_Q[k]\frac{e^{j\omega_k t}-e^{-j\omega_k t}}{2j} \Rightarrow R[k] = \frac{a_I[k]+a_Q[k]}{2},$$
$$R[-k] = \frac{a_I[k]-a_Q[k]}{2}$$

[34], [35], [36]

$$\begin{bmatrix} R[k] \\ R[-k] \end{bmatrix} = \frac{1}{2}\begin{bmatrix} a_I[k]+a_Q[k] \\ a_I[k]-a_Q[k] \end{bmatrix}\begin{bmatrix} R[k]+R^*[-k] \\ R[k]-R^*[-k] \end{bmatrix}\begin{bmatrix} \text{Re}(a_I[k])+j\text{Im}(a_Q[k]) \\ j\text{Im}(a_I[k])+\text{Re}(a_Q[k]) \end{bmatrix}$$

$$\begin{bmatrix} \text{Re}(a_I[k])+j\text{Im}(a_Q[k]) \\ j\text{Im}(a_I[k])+\text{Re}(a_Q[k]) \end{bmatrix} =$$

$$\begin{bmatrix} |H_{TXI}[k]|e^{j(\omega_k\tau_{TX}+\phi_{TX}[k])} \\ |H_{TXQ}[k]|e^{-(j\omega_k\tau_{TX}+\phi_{TX}[k])} \end{bmatrix} == \begin{bmatrix} Y_I[k] \\ Y_Q[k] \end{bmatrix}$$

[37]

$$\begin{bmatrix} Y_I[k] \\ Y_Q[k] \end{bmatrix} = \begin{bmatrix} R[k]+R^*[-k] \\ R[k]-R^*[-k] \end{bmatrix} = \begin{bmatrix} |H_{TXI}[k]|e^{j(\omega_k(\tau_{TX})+\phi_{TX}[k])} \\ |H_{TXQ}[k]|e^{-(j\omega_k(\tau_{TX})+\phi_{TX}[k])} \end{bmatrix}$$

-continued $$\Rightarrow \frac{Y_I[k]}{Y_Q[k]} = \frac{|H_{TXI}[k]|}{|H_{TXQ}[k]|} e^{j(\omega_k(2\tau_{TX})+2\phi_{TX}[k])} \quad [38]$$

Thus, in this manner, a yet further calibration/determination of frequency-dependent IQ (FDIQ) mismatch for 'Y$_I$' and 'Y$_Q$', caused by a combination of transmit low pass filters 378, 382 and receive low pass IF filters 338, 340, can be made. Thus, in accordance with examples of the invention, an additional determination of FDIQ mismatch for 'Y$_I$' and 'Y$_Q$', caused by a combination of transmit low pass filters 378, 382 and receive low pass IF filters 338, 340, can be made by switching in a different IF path and repeating the measurement(s). In this regard, with an additional determination of FDIQ mismatch for 'Y$_I$' and 'Y$_Q$', it is possible to separate the FDIQ mismatch individually contributed from the Tx LPF and Rx LPF respectively.

Figure 6:
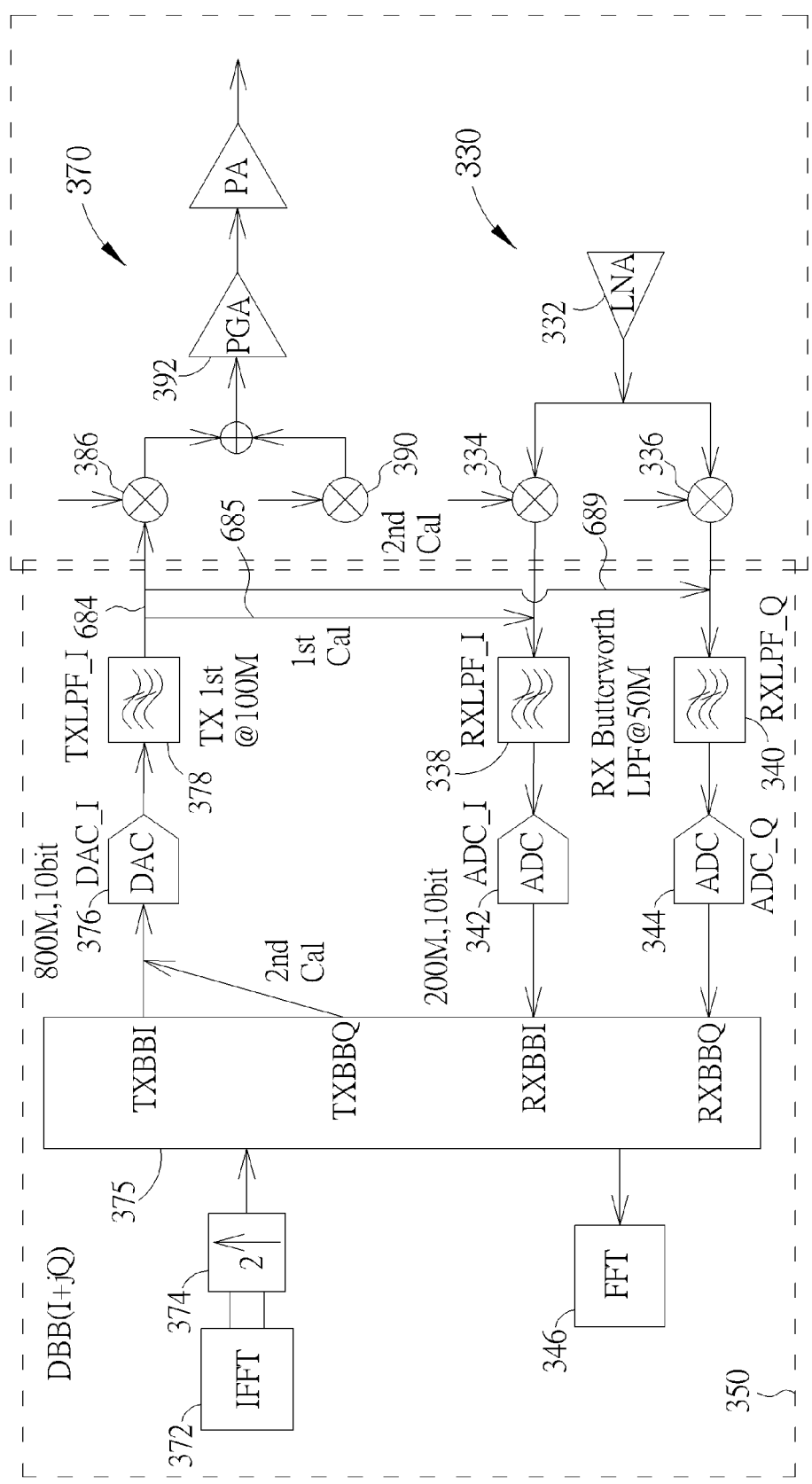
FIG. 6 illustrates a block diagram of a fourth example of an alternative analog IF loopback circuit to calibrate and compensate for FDIQ imbalance according to aspects of the invention.

Referring to FIG. 6, a block diagram of a fourth example of an analog IF loopback circuit to calibrate and compensate for FDIQ imbalance is illustrated, according to aspects of the invention. In the fourth example of an analog IF loopback circuit of FIG. 6, a TxI path is coupled to a RxI path and a TxI path is also coupled to a RxQ path via feedback paths 685, 689 respectively. In other respects, the same architecture of FIG. 3 can be re-used, so will not be re-described in any great detail so as not to obfuscate the description of example embodiments of the invention. In the illustrated example, the baseband/digital and IF circuits/components are provided within an integrated circuit 650. Those skilled in the art will recognize that the functional blocks and/or logic elements herein described may be implemented in a different form, with the integrated circuit comprising more or less circuits/components in other implementations.

Formula Derivation of Multi Tone Receive Signal to Determine FDIQ Imbalance in FIG. 6

$$\begin{bmatrix} r_I(t+\tau_{RX}) \\ r_Q(t-\tau_{RX}) \end{bmatrix} = \begin{bmatrix} h_{RXI}(t+\tau_{RX}) \otimes \cos\omega_k t \\ h_{RXQ}(1-\tau_{RX}) \otimes \sin\omega_k t \end{bmatrix} \Rightarrow \begin{bmatrix} r_I(t) \\ r_Q(t) \end{bmatrix} =$$

$$\begin{bmatrix} h_{RXI} \otimes \cos\omega_k(t+\tau_{RX}) \\ h_{RXQ} \otimes \sin\omega_k(t-\tau_{RX}) \end{bmatrix} \xrightarrow{Frequency\ Domain} \begin{bmatrix} H_{RXI}[k](\cos(\omega_k(t+\tau_{RX}))) \\ H_{RXQ}[k](\sin(\omega_k(t-\tau_{RX}))) \end{bmatrix}$$

$$\begin{bmatrix} |H_{RXI}[k]|(\cos(\omega_k(t+\tau_{RX})+\phi_{RX}[k])) \\ |H_{RXQ}[k]|(\sin(\omega_k(t-\tau_{RX})-\phi_{RX}[k])) \end{bmatrix}$$

[42], [43], [44]

$$r'(t) = r'_I(t) + jr'_Q(t) = |H_{RXI}[k]|(\cos(\omega_k(t+\tau_{RX})+\phi_{RX}[k])) +$$
$$j|H_{RXQ}[k]|(\sin(\omega_k(t-\tau_{RX})-\phi_{RX}[k])) =$$
$$\cos\omega_k t[|H_{RXI}[k]|\cos(\omega_k\tau_{RX}+\phi_{RX}[k]) -$$
$$j|H_{RXQ}[k]|\sin(\omega_k\tau_{RX}+\phi_{RX}[k])] +$$
$$j\sin\omega_k t[|H_{RXQ}[k]|\cos(\omega_k\tau_{RX}+\phi_{RX}[k]) +$$
$$j|H_{RXI}[k]|\sin(\omega_k\tau_{RX}+\phi_{RX}[k])] =$$
$$a'_I[k]\cos\omega_k t + ja'_Q[k]\sin\omega_k t$$

[45], [46]

$$r'(t) = a'_I[k]\cos\omega_k t + ja'_Q[k]\sin\omega_k t =$$

$$a'_I[k]\frac{e^{j\omega_k t}+e^{-j\omega_k t}}{2} + ja'_Q[k]\frac{e^{j\omega_k t}-e^{-j\omega_k t}}{2j} \Rightarrow R'[k] =$$

-continued $$\frac{a'_I[k]+a'_Q[k]}{2}, R'[-k] = \frac{a'_I[k]-a'_Q[k]}{2}$$

[47], [78], [49]

$$\begin{bmatrix} R'[k] \\ R'[-k] \end{bmatrix} = \frac{1}{2}\begin{bmatrix} a'_I[k]+a'_Q[k] \\ a'_I[k]-a'_Q[k] \end{bmatrix}\begin{bmatrix} R'[k]+R^*[-k] \\ R'[k]-R^*[-k] \end{bmatrix}$$

$$\begin{bmatrix} \text{Re}(a'_I[k])+j\text{Im}(a'_Q[k]) \\ j\text{Im}(a'_I[k])+\text{Re}(a'_Q[k]) \end{bmatrix} = \begin{bmatrix} \text{Re}(a'_I[k])+j\text{Im}(a'_Q[k]) \\ j\text{Im}(a'_I[k])+\text{Re}(a'_Q[k]) \end{bmatrix} =$$

$$\begin{bmatrix} |H_{RXI}[k]|e^{j(\omega_k\tau_{RX}+\phi_{RX}[k])} \\ |H_{RXQ}[k]|e^{-j(\omega_k\tau_{RX}+\phi_{RX}[k])} \end{bmatrix} == \begin{bmatrix} Y'_I[k] \\ Y'_Q[k] \end{bmatrix}$$

[50]

$$\begin{bmatrix} X_I[k] \\ X_Q[k] \end{bmatrix} = \begin{bmatrix} R[k]+R^*[-k] \\ R[k]-R^*[-k] \end{bmatrix} = \begin{bmatrix} |H_{RXI}[k]|e^{j(\omega_k(\tau_{RX})+\phi_{RX}[k])} \\ |H_{RXQ}[k]|e^{-j(\omega_k(\tau_{RX})+\phi_{RX}[k])} \end{bmatrix}$$

[51]

$$\Rightarrow \frac{X_I[k]}{X_Q[k]} = \frac{|H_{RXI}[k]|}{|H_{RXQ}[k]|} e^{j(\omega_k(2\tau_{RX})+2\phi_{RX}[k])}$$

Figure 7:
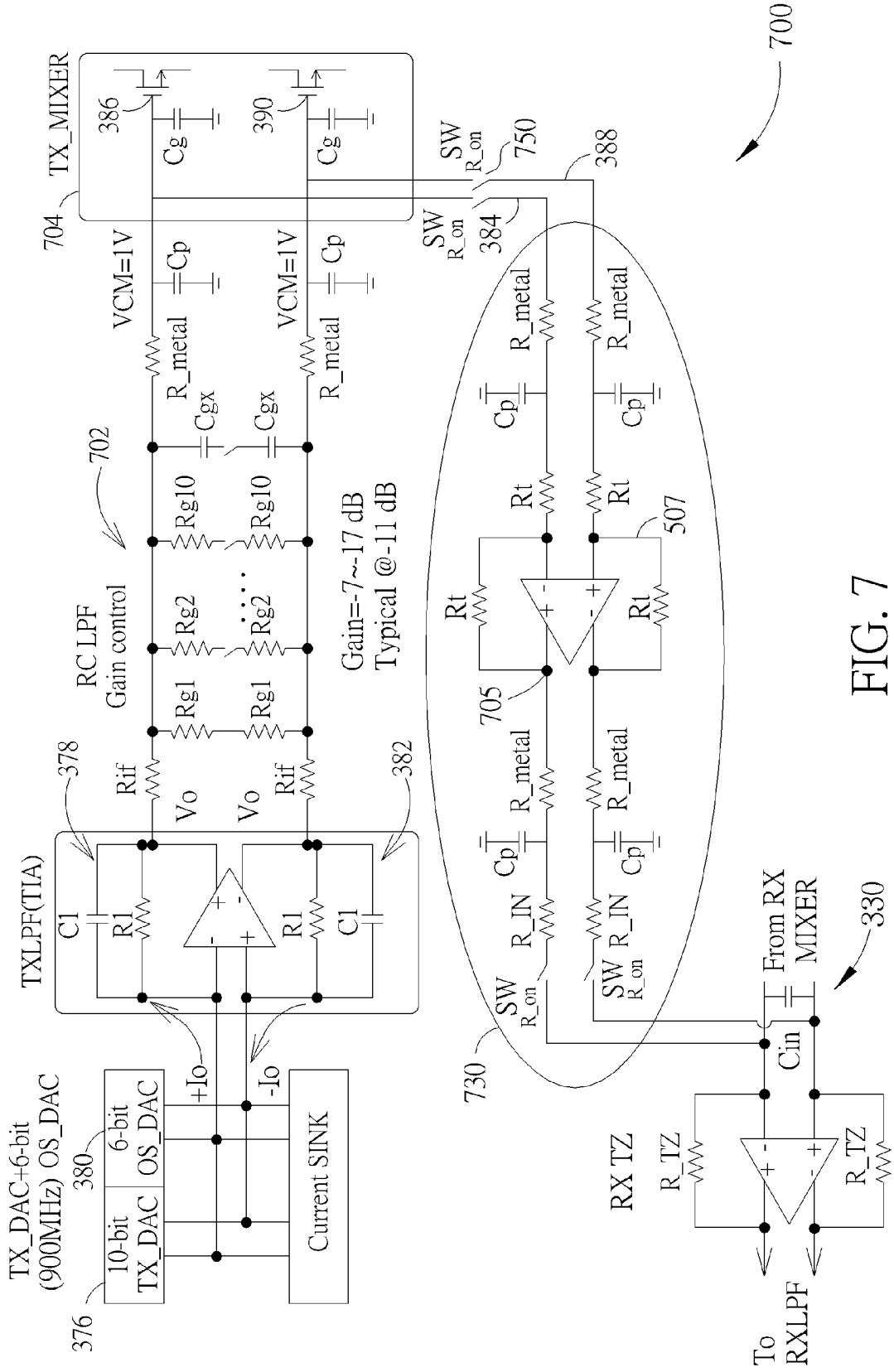
FIG. 7 illustrates a block diagram of a more detailed FDIQ calibration circuit clarifying one example of an analog IF loopback according to aspects of the invention.

Referring to FIG. 7, a block diagram of a more detailed FDIQ analog IF loopback calibration circuit 700, according to aspects of the invention, is illustrated. In this more detailed example, FIG. 7 shows the IF loopback circuit, for 'I' and 'Q', with the operation explained relating to the implementation to that of FIG. 3. A skilled artisan will recognise that a different switching network 750 may facilitate other analog IF feedback paths from the transmit circuit to the receive circuit.

In this example, FIG. 7 comprises, DACs, which may be similar to DACs 376, 380 from FIG. 3, LPFs, which may be similar to LPF 378, 382 from FIG. 3, LPF gain control 702 and frequency up-conversion mixer 704, which may comprise mixers similar to mixers 386, 388 from FIG. 3.

In this example, connections between the outputs from LPFs 378, 382 and inputs to frequency up-conversion mixers 386, 390 of FIG. 7 are operably coupled in an analog IF loopback sense to a receiver, for example receiver 330 from FIG. 3.

In some examples, the IF loopback path through compensation circuit 730 may allow for calibration/adaptation of transmit or receive FDIQ imbalance caused by LPFs 378, 382 in the transmit path and/or LPFs in the receive path. In some examples, a multi-tone test signal may be applied to circuit 700 as a calibration signal, in order to facilitate calculation of FDIQ imbalance in the frequency domain. In some examples, the multi-tone test signal may be regarded as a training signal.

Referring to FIG. 8, an example of a frequency-dependent IQ imbalance compensation circuit 800 is illustrated. In this example, much of the architecture relating to transmitting and receiving signals has already been described in previous FIGS. 3-7 and, therefore, will not be discussed again in detail.

In this example, the digital signal processing of the baseband circuit 800 has been modified and expanded, in order to explain advantageous features of the invention.

In some examples, advantageous features of previous examples, for example calibration/adaptation of transmit or receive FDIQ imbalance and/or use of multi tone test signals may be utilised by circuits illustrated in FIGS. 8 and 9 in order to compensate for FDIQ imbalance using a digital filter in the time-domain or compensate for FDIQ imbalance in the frequency domain directly.

The digital baseband region 800 comprises a transmit signal encoding function 820 and a decoding function 840. The encoding function 820 comprises a baseband encoder 822 operably coupled to an inverse fast Fourier transform (iFFT) 824. The baseband encoder outputs signals in the frequency domain, which are converted to the time-domain by iFFT 824. The resultant output time-domain signals are in quadrature form (BBI 826 and BBQ 828). The resultant output time-domain signals 826, 828 are input to one or more interpolators 830, before being output to the baseband quadrature multiplexer 375.

In some examples, a control or signal processor (not shown) may be operably coupled to FDIQ compensation blocks 832 and 842 and provide thereto control and/or adjustment signals or instructions. In some examples, such control and/or adjustment signals or instructions may be provided by BB decoder 849 or FFT 846.

In this example, in the transmit path and in order to reduce FDIQ imbalance/mismatches, an FDIQ compensation module 832 may be utilised in one (or both) of the quadrature paths prior to the one or more interpolators 830. In this example, the FDIQ compensation module 832 is a digital filter operable to implement an N-tap time-domain compensation coefficient to one of the quadrature paths based on a determined M-tap frequency domain coefficient. This may be achieved utilising the formula below.

Where:

$$\Gamma^{M \times 1} = W^{M \times N} \gamma^{N \times 1} \quad [52], [53]$$

$$\gamma^{N \times 1} = (W^{M \times N})^{+} \Gamma^{M \times 1}$$

$$= \underbrace{(W^H W)^{-1} W^H}_{\substack{k,l \\ \text{IDFT Matrix}}} \Gamma$$

where $\Gamma^{M \times 1}$ is the FDIQ compensation component in frequency domain, and there exists a relationship $W^{M \times N}$ between the FDIQ compensation component in frequency and time domain. In order to calculate the N-tap time-domain coefficient, 'M' should equal $2^X$. An iFFT is then performed to calculate $\gamma^{N \times 1}$ Therefore, in this manner, FDIQ compensation module 832 may be operable to reduce FDIQ imbalance/mismatches in the time domain, before resultant signals are interpolated by the one or more interpolation modules 830.

Similarly, a received signal through the receiver chain 840 impaired by FDIQ could be compensated by the module 842 operably coupled to a BBQ function 844. A fast Fourier transform module (FFT) 846 is operable to receive quadrature signals (BBQ 844 and BBI 848), and convert them into the frequency domain. An output from the FFT module 846 is then input to a baseband decoder module 849, which may be operable to decode the signal received from the FFT module 846.

In this example, the further FDIQ compensation module 842 may be operable to reduce FDIQ imbalance between BBI 848 and BBQ 844 signals, prior to demodulation by the FFT module 846.

Referring to FIG. 9, an example of a further frequency-dependent IQ imbalance calculation and compensation circuit 900 is illustrated. In this example, much of the architecture has already been described in relation to previous FIGs and, therefore, will not be discussed again in detail.

In this example, contrary to the example in FIG. 8, FDIQ compensation may be done in the frequency-domain, rather than in the time-domain.

Referring first to encoding function 920, a baseband encoder module 922 outputs a first quadrature signal (I) 923 and a second quadrature signal (Q) 924 to iFFT 926. The second quadrature signal (Q) 924, is however, routed through an FDIQ compensation module 925, situated between the baseband encoder module 922 and the iFFT module 926. The FDIQ imbalance compensation module 925 that is operable to compensate for FDIQ imbalance in the frequency domain, before outputting a frequency-dependent IQ imbalance compensated signal to the iFFT 926.

Similarly, referring to decoding function 940, a FFT module 942 is operable to receive quadrature baseband signals (BBI 944 and BBQ 946) from the receiver path. The FFT module 942 converts the received time-domain signals into frequency domain signals, which are output to a baseband decoder module 948. In this example, a first quadrature signal (I) 947 is output by the FFT module 942 to the baseband decoder module 948, and a second quadrature signal (Q) 949 is output by the FFT module 942 to the baseband decoder module 948 via a further FDIQ imbalance compensation module 941.

Therefore, the further FDIQ imbalance compensation module 941 may be operable to reduce FDIQ imbalance/mismatch between the first quadrature signal (I) 947 and the second quadrature signal (Q) 949 in the frequency domain, prior to demodulation by the baseband decoder module 948.

In this example, linear interpretation of $G_{TX}[k]$, from FDIQ imbalance compensation module 925, and $G_{RX}[k]$, from FDIQ imbalance compensation module 941, from a calibration signal's FFT length to the real modulation signal's FFT length, may produce a compensation value that can be applied to the compensation modules 925, 941 in the frequency domain.

It will be further appreciated that, for clarity purposes, the described embodiments of the invention with reference to different functional units and processors may be modified or re-configured with any suitable distribution of functionality between different functional units or processors is possible, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. For example, the software may reside on non-transitory computer program product comprising executable program code to increase coverage in a wireless communication system.

In one example, the program code may be employed by digital signal processing in a communication unit, for example a wireless communication unit. The executable program code may be operable for, when executed by the digital signal processing, to perform a method for determining frequency-dependent quadrature (FDIQ) imbalance in a communication unit. The method comprises: receiving a first quadrature test signal; and filtering the first quadrature test signal; selectively first routing the filtered first quadrature test signal to a quadrature receiver via a first route of an analog feedback loopback path; further filtering the filtered first quadrature test signal; receiving and decoding the further filtered first quadrature test signal; subsequently receiving a second quadrature test signal; filtering the second quadrature test signal; selectively routing a filtered second quadrature test signal to a quadrature receiver via a second route different from the first route; and determining a frequency-dependent quadrature imbalance of at least one component in at least one of a transmitter or receiver based on the decoded further filtered first quadrature test signal and the decoded further filtered second quadrature test signal.

Thus, the elements and components of an embodiment of the invention may be physically, functionally and logically implemented in any suitable way. Indeed, the functionality may be implemented in a single unit, in a plurality of units or as part of other functional units.

Those skilled in the art will recognize that the functional blocks and/or logic elements herein described may be implemented in an integrated circuit for incorporation into one or more of the communication units. For example, an integrated circuit for a communication unit for determining frequency-dependent quadrature (FDIQ) imbalance is described. The integrated circuit comprises a quadrature transmitter comprising: a quadrature transmit baseband circuit arranged to receive a first quadrature test signal; and at least one analog transmit filter for filtering the first quadrature test signal. An analog feedback loopback path selectively first routes the filtered first quadrature test signal to a quadrature receiver via a first route. The quadrature receiver comprises: at least one analog receive filter for further filtering the filtered first quadrature test signal; and a quadrature receive baseband circuit arranged to receive and decode the further filtered first quadrature test signal; wherein the quadrature transmitter is arranged to subsequently receive a second quadrature test signal and the analog feedback loopback path selectively routes a filtered second quadrature test signal to the quadrature receiver via a second route that is different from the first route such that the quadrature receive baseband circuit is arranged to determine a frequency-dependent quadrature imbalance of at least one component in at least one of the transmitter or receiver based on a decoded further filtered first quadrature test signal and the decoded further filtered second quadrature test signal.

Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

What is claimed is:

1. A communication unit for determining frequency-dependent quadrature (FDIQ) imbalance, the communication unit comprising:
    a quadrature transmitter comprising:
        an input for receiving an first quadrature test signal; and
        at least one analog transmit filter for filtering the first quadrature test signal;
    an analog feedback loopback path for selectively first routing the filtered first quadrature test signal to a quadrature receiver via a first route;
    the quadrature receiver comprising:
        at least one analog receive filter for further filtering the filtered first quadrature test signal; and
        a quadrature receive baseband circuit arranged to receive and decode the further filtered first quadrature test signal;
    wherein the quadrature transmitter is arranged to receive a second quadrature test signal and the analog feedback loopback path selectively routes a filtered second quadrature test signal to the quadrature receiver via a second route that is different from the first route and the quadrature receive baseband circuit is arranged to determine a frequency-dependent quadrature imbalance of at least one component in at least one of the transmitter or receiver based on the decoded further filtered first quadrature test signal and the decoded further filtered second quadrature test signal.

2. The communication unit of claim 1 wherein the analog feedback loopback path for selectively first routing the filtered encoded quadrature test signals comprises at least one of a switch network, a multiplexer, such that the first route and second route can be selectively switched.

3. The communication unit of claim 1 wherein the test signal is a multi tone test signal.

4. The communication unit of claim 1 wherein the test signal comprises a multiple sequential transmission of tones at different frequencies, such that the quadrature receive baseband circuit is arranged to determine a frequency-dependent quadrature imbalance, of at least one component in at least one of the transmitter or receiver, at each of the different frequencies.

5. The communication unit of claim 3 wherein the multi tone test signal comprises tones with equal frequency spacing where the tones are generated from a fast fourier transform at the same time, such that the quadrature receive baseband circuit determines a frequency-dependent quadrature imbalance of at least one component, in at least one of the transmitter or receiver, at each of the different frequencies.

6. The communication unit of claim 1 wherein the communication unit further comprises a test signal generator operably coupled to the quadrature transmitter and arranged to generate the first test signal.

7. The communication unit of claim 1 wherein the first test signal is the same as the second signal.

8. The communication unit of claim 1 wherein the quadrature transmitter further comprises a quadrature transmit baseband circuit arranged to receive and encode the first test signal and provide a quadrature encoded first test signal to the at least one analog transmit filter.

9. The communication unit of claim 8, wherein the first and second test signal comprises a quadrature digital baseband signal and the communication unit further comprises:
   a digital to analog conversion circuit, arranged to convert the quadrature digital baseband signal from the quadrature transmit baseband circuit to an analog intermediate frequency (IF) quadrature signal comprising quadrature components to route to the at least one analog transmit filter; and
   an analog to digital conversion circuit, arranged to convert an loopback analog IF quadrature signal comprising quadrature components to a quadrature digital baseband signal.

10. The communication unit of claim 1 wherein the quadrature receive baseband circuit is operably coupled to an FDIQ compensation module arranged to compensate at least one component or circuit in the communication unit to reduce FDIQ mismatch based on the determined frequency-dependent quadrature imbalance.

11. The communication unit of claim 10 wherein the quadrature receive baseband circuit is operably coupled to an FDIQ compensation module arranged to compensate individual FDIQ mismatch between a plurality of baseband low pass filters.

12. The communication unit of claim 10, wherein the FDIQ compensation module is operable to compensate FDIQ imbalance in a frequency domain.

13. The communication unit of claim 10, wherein the FDIQ compensation module comprises a digital filter arranged to be controlled to compensate FDIQ imbalance in a time domain.

14. The communication unit of claim 1 wherein the quadrature receive baseband circuit is arranged to determine transmit and receive FDIQ parameters ($G_{Tx}$, $G_{Rx}$), according to:

$$G_{RX}[k] = \frac{Y_I[k]}{Y_I'[k]} = \frac{|H_{RXI}[k]|}{|H_{RXQ}[k]|} e^{2j(\omega_k \tau_{RX} + \phi_{RX}[k])};$$

and $$G_{TX}[k] = \frac{Y_I[k]}{Y_Q[k]} \bigg/ G_{RX}[k] = \frac{|H_{TXI}[k]|}{|H_{TXQ}[k]|} e^{2j(\omega_k \tau_{TX} + \phi_{TX}[k])}.$$

15. The communication unit of claim 1, wherein the analog feedback loopback path is arranged to couple at least two from:
   an output from a quadrature 'I' transmit low pass filter to an input of a quadrature 'I' low pass filter in the receiver;
   an output from a quadrature 'I' transmit low pass filter to an input of a quadrature 'Q' low pass filter in the receiver;
   an output from a quadrature 'Q' transmit low pass filter to an input of a quadrature 'I' low pass filter in the receiver;
   an output from a quadrature 'Q' transmit low pass filter to an input of a quadrature 'Q' low pass filter in the receiver.

16. A method for determining frequency-dependent quadrature (FDIQ) imbalance in a communication unit, the method comprising:
   receiving a first quadrature test signal; and
   filtering the first quadrature test signal;
   selectively first routing the filtered first quadrature test signal to a quadrature receiver via a first route of an analog feedback loopback path;
   further filtering the filtered first quadrature test signal;
   receiving and decoding the further filtered first quadrature test signal;
   subsequently receiving a second quadrature test signal;
   filtering the second quadrature test signal;
   selectively routing a filtered second quadrature test signal to a quadrature receiver via a second route different from the first route; and
   determining a frequency-dependent quadrature imbalance of at least one component in at least one of a transmitter or receiver based on the decoded further filtered first quadrature test signal and the decoded further filtered second quadrature test signal.

17. A non-transitory computer program product having executable program code stored therein for determining frequency-dependent quadrature (FDIQ) imbalance, the program code operable for, when executed in a communication unit: performing the method of claim 16.

18. An integrated circuit for a communication unit for determining frequency-dependent quadrature (FDIQ) imbalance, the integrated circuit comprising:
   a quadrature transmitter comprising:
      a quadrature transmit baseband circuit arranged to receive a first quadrature test signal; and
      at least one analog transmit filter for filtering the first quadrature test signal;
   an analog feedback loopback path for selectively first routing the filtered first quadrature test signal to a quadrature receiver via a first route;
   the quadrature receiver comprising:
      at least one analog receive filter for further filtering the filtered first quadrature test signal; and
      a quadrature receive baseband circuit arranged to receive and decode the further filtered first quadrature test signal;
   wherein the quadrature transmitter is arranged to subsequently receive a second quadrature test signal and the analog feedback loopback path selectively routes a filtered second quadrature test signal to the quadrature receiver via a second route that is different from the first route such that the quadrature receive baseband circuit is arranged to determine a frequency-dependent quadrature imbalance of at least one component in at least one of the transmitter or receiver based on a decoded further filtered first quadrature test signal and the decoded further filtered second quadrature test signal.

* * * * *